United States Patent Office 2,715,708
Patented Aug. 16, 1955

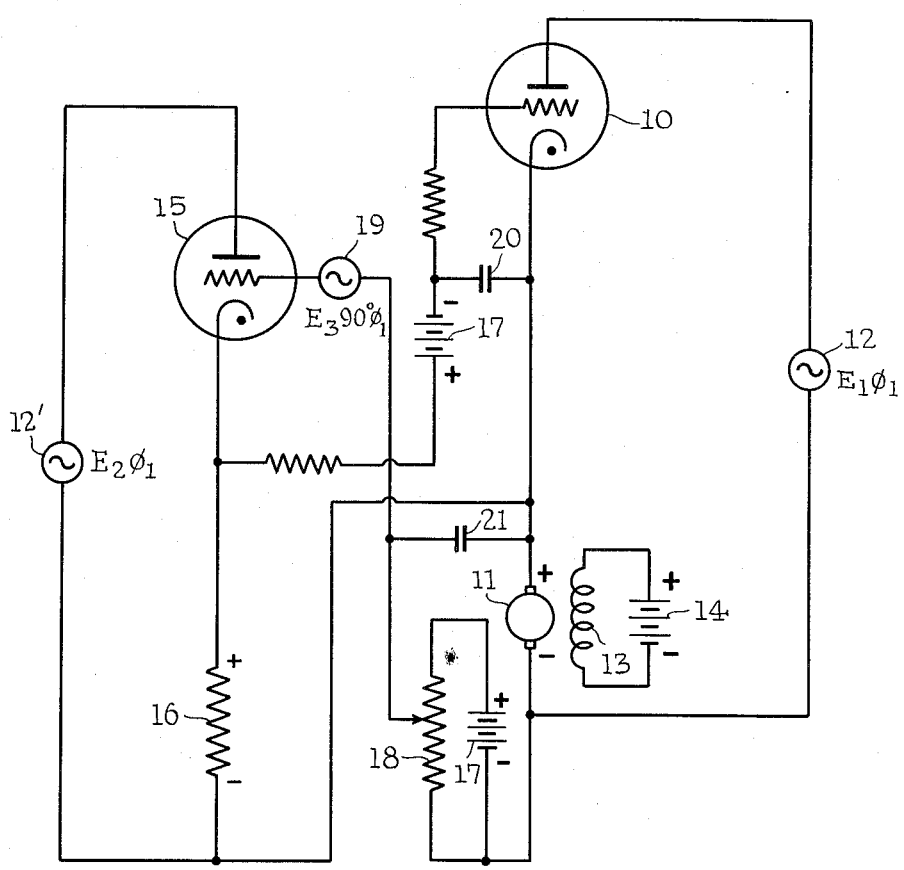

2,715,708

ELECTRONIC MOTOR SPEED CONTROL

Oscar E. Carlson, Paterson, N. J.

Application June 4, 1954, Serial No. 434,517

4 Claims. (Cl. 318—331)

This invention relates to motor control systems and more particularly to systems which control the running speed of a D. C. motor connected through a gaseous rectifier to an A. C. source.

Prior art systems of this type generally employ as basic circuitry, a thyratron connected in series with the armature of the motor and the A. C. source and utilize some form of degenerative control of the thyratron by connecting in the grid circuit, a voltage proportional to the motor armature voltage or current. Since the latter varies with mechanical load on the motor, a satisfactory control of motor speed is possible under varying motor load conditions. For a showing of a basic circuit of this type, see the U. S. patent to Quarles, Number 1,944,756 of 1934. The sensitivity of such systems is limited however, due to the inherent characteristics of degenerative feed back circuits.

It is an object of the present invention to provide a motor speed control circuit with greatly increased sensitivity.

A further object of this invention is to provide a system of amplification such that the power stage of the control system is allowed to operate without degeneration.

The following detailed description read in connection with the accompanying drawing will provide those skilled in the art with a complete disclosure of the invention.

The single figure of the drawing shows schematically a preferred embodiment of this invention.

The power thyratron 10 is connected to supply D. C. voltage to the armature 11 of the motor from an alternating current source indicated at 12. The field winding 13 of the motor may be energized in any convenient manner by connecting it to a source of D. C. voltage. Battery 14 shown in the drawing is symbolic.

The remainder of the circuit is for the express purpose of controlling the firing time of the power thyratron in accordance with the mechanical load on the motor. In order to achieve a maximum sensitivity of control, a second thyratron 15 is used as a basic control circuit element. Thyratron 15 may conveniently be a high voltage low current device as compared with the power thyratron 10, which is a low voltage high current device. Accordingly, it is conveniently operated with an anode voltage of the order of three to five times that of the thyratron 10 and is connected to supply D. C. voltage to a resistive load 16, from the A. C. source indicated at 12'. It will be understood that the A. C. sources indicated at 12 and 12' are simply different voltages taken from the same source. The load 16 is connected at its positive end to the grid of power thyratron 10 in series with a holdoff bias symbolized by battery 17. The negative side of the load 16 is connected to the cathode of the power thyratron 10. Thus it will be apparent that the firing time of thyratron 10 will be controlled at least in part by the voltage existing across the load 16. The magnitude of the voltage across load 16 in turn will be controlled by the firing time of the control thyratron 15.

In order to vary the firing time of thyratron 15 in accordance with the mechanical load on the motor, the armature voltage (impressed voltage minus IR drop in the armature) is connected between the grid and cathode of the thyratron 15. The negative side of the motor is therefor connected to grid of thyratron 15 through a circuit which includes an A. C. voltage substantially 90° out of phase with the anode voltage and a D. C. reference voltage which is of a polarity such as to oppose the armature voltage. The D. C. reference voltage is preferably adjustable in order to vary the base speed of the motor and is symbolized on the drawing by a battery 17 connected to opposite ends of a potentiometer 18. The phase shifted A. C. voltage is indicated schematically at 19. Condensers 20 and 21 merely act as stabilizers or smoothing filters.

With this circuit arrangement, it will be apparent to those skilled in the art, that the power stage is allowed to operate with no direct coupled feed back and therefore no degeneration and that as a result the circuit gain is increased substantially. The second or control thyratron acts as an amplifier to increase the error voltage and therefore eliminate the necessity of complex and bulky D. C. amplifier circuits.

The operation of the circuit may be briefly summarized as follows.

With the field 13 energized at a fixed level, the motor will run at a speed which is determined by the voltage applied to the motor armature by the thyratron 10. The magnitude of the applied armature voltage is dependent upon the point in the applied A. C. voltage cycle at which the thyratron 10 is caused to conduct. By varying the D. C. grid voltage of the thyratron 10, this tube may be caused to conduct over substantially the whole positive half of the A. C. cycle or only over a portion of this cycle.

When the load on the motor increases, the armature current and voltage increase proportionately. The armature voltage increase causes the control thyratron to conduct over a greater portion of the applied A. C. voltage cycle which results in an increased voltage drop across the load device 16. Since the latter voltage forms a portion of the grid to cathode voltage of thyratron 10, this tube then fires earlier in the applied A. C. voltage cycle and impresses a correspondingly larger voltage on the armature of the motor to maintain constant speed thereof.

It will be apparent that full rather than half wave circuits as shown, could be used with equal effectiveness. Other variations will also be apparent within the scope of the following claims.

I claim:

1. A running speed control system for D. C. motors comprising: grid controlled gaseous rectifier means connected to supply D. C. voltage to the armature of the motor from an A. C. source; means comprising an electrical load device; means for supplying D. C. voltage to said load device including a thyratron and means for supplying the anode-cathode circuit of said thyratron through said load device with only an A. C. voltage, the magnitude of the A. C. voltage being of the order of three to five times the magnitude of the anode-cathode voltage of said gaseous rectifier means; means connecting opposite ends of said load device to the grid and cathode circuits of said gaseous rectifier means; means connected to the grid of said thyratron for supplying thereto, an A. C. voltage which is substantially 90 degrees out of phase with the anode voltage; means providing a D. C. reference voltage; means connecting in the thyratron grid to cathode circuit a voltage which is the resultant of a voltage proportional to the back E. M. F. of the motor connected in series with the phase shifted A. C. voltage and in series opposition with the D. C. reference voltage;

and means for immersing the motor armature in a unidirectional magnetic field.

2. A running speed control system for D. C. motors comprising: grid controlled gaseous rectifier means connected to supply D. C. voltage to the armature of the motor from an A. C. source; means comprising an electrical load device; means for supplying D. C. voltage to said load device including a thyratron and means for supplying the anode-cathode circuit of said thyratron through said load device with only an A. C. voltage, the magnitude of the A. C. voltage being of the order of three to five times the magnitude of the anode-cathode voltage of said gaseous rectifier means; means connecting opposite ends of said load device to the grid and cathode circuits of said gaseous rectifier means; means connected to the grid of said thyratron for supplying thereto, an A. C. voltage which is substantially 90 degrees out of phase with the anode voltage; means providing a D. C. reference voltage; means connecting the negative side of the motor armature to the thyratron grid in series opposition to said reference voltage and in series with the phase shifted A. C. voltage; means connecting the positive side of the motor armature to the negative side of the load device; and means for immersing the motor armature in a unidirectional magnetic field.

3. A system as defined by claim 1 in which the D. C. reference voltage is adjustable to vary the base speed of the motor.

4. A system as defined by claim 1 in which the load device is connected in the cathode circuit of the thyratron.

References Cited in the file of this patent

UNITED STATES PATENTS

| | | |
|---|---|---|
| 2,264,330 | Satterlee | Dec. 2, 1941 |
| 2,689,320 | Aloisio | Sept. 14, 1945 |

FOREIGN PATENTS

| | | |
|---|---|---|
| 669,850 | Great Britain | Apr. 9, 1952 |